United States Patent
Feng

(10) Patent No.: US 10,388,051 B2
(45) Date of Patent: Aug. 20, 2019

(54) PICTURE SYNTHESIS METHOD AND APPARATUS, INSTANT COMMUNICATION METHOD, AND PICTURE SYNTHESIS SERVER

(71) Applicant: Alibaba Group Holding Limited, Grand Cayman (KY)

(72) Inventor: Puchao Feng, Zhejiang (CN)

(73) Assignee: Alibaba Group Holding Limited, Cayman Islands (KY)

( * ) Notice: Subject to any disclaimer, the term of this patent is extended or adjusted under 35 U.S.C. 154(b) by 0 days.

(21) Appl. No.: 15/721,405

(22) Filed: Sep. 29, 2017

(65) Prior Publication Data

US 2018/0025523 A1 Jan. 25, 2018

Related U.S. Application Data

(63) Continuation of application No. PCT/CN2016/076695, filed on Mar. 18, 2016.

(30) Foreign Application Priority Data

Apr. 3, 2015 (CN) .......................... 2015 1 0159422

(51) Int. Cl.
*G06T 3/00* (2006.01)
*G06T 11/60* (2006.01)
(Continued)

(52) U.S. Cl.
CPC .............. *G06T 11/60* (2013.01); *G06T 7/11* (2017.01); *H04L 67/02* (2013.01)

(58) Field of Classification Search
CPC ............. G06T 11/60; G06T 7/11; H04L 67/02
See application file for complete search history.

(56) References Cited

U.S. PATENT DOCUMENTS 5,848,123 A * 12/1998 Strommer .......... H04N 5/37206
378/98.8
7,567,273 B2 * 7/2009 Knoedgen ............ H04N 5/4448
348/187
(Continued)

FOREIGN PATENT DOCUMENTS

CN 101000688 A 7/2007
CN 102075661 A 5/2011
(Continued)

OTHER PUBLICATIONS

Translation of International Search Report. from corresponding PCT application No. PCT/CN2016/076695 dated Jun. 13, 2016, 2 pages.

(Continued)

*Primary Examiner* — Gregory M Desire
(74) *Attorney, Agent, or Firm* — Lee & Hayes, P.C.

(57) ABSTRACT

A picture synthesis method and apparatus, an instant messaging method and a picture synthesis server/device are disclosed. The method comprises: after at least two pictures to be synthesized are acquired, determining a visual center of each of the pictures to be synthesized; cutting the corresponding pictures to be synthesized in accordance with the visual center of each of the pictures to be synthesized and a first set specification; and synthesizing all of the cut pictures to be synthesized to obtain a synthesized picture. Due to full consideration of the visual center of each of the pictures to be synthesized, a visual effect of the finally obtained synthesized picture is ensured, thereby improving the user experience.

20 Claims, 6 Drawing Sheets

(51) Int. Cl.
*G06T 7/11* (2017.01)
*H04L 29/08* (2006.01)

(56) References Cited

U.S. PATENT DOCUMENTS

| | | | | |
|---|---|---|---|---|
| 8,331,690 B2* | 12/2012 | Oh | ............................ | G06K 9/32 382/199 |
| 9,870,503 B2* | 1/2018 | Kawas | ................ | G06K 9/00597 |
| 2012/0251010 A1* | 10/2012 | Cao | ........................ | G06K 9/4671 382/201 |
| 2014/0218552 A1* | 8/2014 | Huang | .................. | G11B 27/034 348/218.1 |
| 2016/0050368 A1* | 2/2016 | Seo | ............................ | G06T 7/11 348/36 |
| 2018/0025523 A1* | 1/2018 | Feng | .......................... | G06T 7/11 382/284 |

FOREIGN PATENT DOCUMENTS

| | | |
|---|---|---|
| CN | 102881032 | 1/2013 |
| CN | 103198073 | 7/2013 |
| CN | 103810490 A | 5/2014 |
| JP | 2001333064 A | 11/2001 |
| JP | 2000235641 | 7/2009 |

OTHER PUBLICATIONS

Translation of Written Opinion from corresponding PCT application No. PCT/CN2016/076695 dated Jun. 13, 2016, 6 pages.

Chinese Office Action for Application No. 201510159422.8, dated Mar. 12, 2019, Feng, "Image Synthesis Method, Image Synthesis Device, Instant Messaging Method, and Image Synthesis Server", 11 pages.

Chinese Office Action for Application No. 201510159422.8, dated Sep. 13, 2018, Feng, "Image Synthesis Method, Image Synthesis Device, Instant Messaging Method, and Image Synthesis Server", 7 pages.

Chinese Search Report from Chinese application No. 201510159422.8 dated Sep. 4, 2018, 2 pages.

* cited by examiner

PICTURE SYNTHESIS METHOD AND APPARATUS, INSTANT COMMUNICATION METHOD, AND PICTURE SYNTHESIS SERVER

CROSS REFERENCE TO RELATED PATENT APPLICATIONS

This application claims priority to and is a continuation of PCT Patent Application No. PCT/CN2016/076695 filed on 18 Mar. 2016, and is related to and claims priority to Chinese Patent Application No. 201510159422.8, filed on Apr. 3, 2015, entitled "Picture Synthesis Method and Apparatus, Instant Messaging Method and Picture Synthesis Server," which are hereby incorporated by reference in their entirety.

TECHNICAL FIELD

The present disclosure relates to the technological field of picture processing, and particularly, to picture synthesis methods and apparatuses, instant communication methods, and picture synthesis servers.

BACKGROUND

Along with the rapid development of multimedia technologies, user demands for processing pictures have also increased. Picture processing includes picture clipping, picture color change, picture synthesis, etc. Picture synthesis refers to presenting multiple pictures to be combined in a background wall to obtain a combined picture, and thus achieving a goal of presenting the multiple pictures to be combined in a single combined picture. An existing picture synthesis method is described in detail herein.

According to an existing picture synthesis method, at least two pictures to be combined are obtained. Each picture to be combined is proportionally compressed in size according to a size of a background wall. Each reduced-size picture to be combined is pasted in the background wall at a specific location to obtain a combined picture, thus completing a combination of multiple pictures. This method only performs simple proportional compression and pasting for each picture to be combined, without considering a visual center of a combined picture. The combined picture obtained thereby has a very poor visual effect, and seriously affects the experience of a user.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a method and an apparatus of picture synthesis, an instant communication method, and a picture synthesis server, to solve the existence of the problem of poor visual effects of a combined picture which seriously affect user experience in existing technologies.

According to the embodiments of the present disclosure, a picture synthesis method is provided, which includes obtaining at least two pictures to be combined; determining a visual center of each picture to be combined; tailoring a corresponding picture to be combined according to the visual center of each picture to be combined and a first set specification; and combining each tailored picture to be combined to obtain a combined picture.

In implementations, determining the visual center of each picture to be combined may include dividing a respective picture to be combined into sub-pictures having a size of a second set specification for each picture to be combined; calculating a set target identification value for each sub-picture using a set target identification algorithm; and clustering each sub-picture to obtain a visual center of the respective picture to be combined based on the set target recognition value of each sub-picture and a clustering algorithm.

In implementations, the method further includes storing each tailored picture to be combined into a picture bank; assigning a universal resource locator (URL) to storing each tailored picture to be combined; and storing the URL of each tailored picture to be combined into a distributed database.

In implementations, combining each tailored picture to be combined to obtain the combined picture may include obtaining the URL of each tailored picture to be combined from the distributed database; obtaining the respective tailored picture to be combined from the picture bank based on the URL of each tailored picture to be combined; and combining each tailored picture to be combined to obtain the combined picture.

In implementations, the method further includes keeping tracking of a time duration of an existence of the combined picture; determining whether the time duration of existence is greater than a set time period; destroying the combined picture in response to determining that the time of existence is greater than the set time period.

According to the embodiments of the present disclosure, a picture synthesis apparatus is also provided, which includes an acquisition unit configured to obtain at least two pictures to be combined; a determination unit configured to determine a visual center of each picture to be combined; a tailoring unit configured to tailor a corresponding picture to be combined according to the visual center of each picture to be combined and a first set specification; and a combination unit configured to combine each tailored picture to be combined to obtain a combined picture.

In implementations, the determination unit, which is configured to determine the visual center of each picture to be combined, may be configured to divide a respective picture to be combined into sub-pictures having a size of a second set specification for each picture to be combined, calculate a set target identification value for each sub-picture using a set target identification algorithm, and cluster each sub-picture to obtain a visual center of the respective picture to be combined based on the set target recognition value of each sub-picture and a clustering algorithm.

In implementations, the apparatus further include a first storage unit configured to store each tailored picture to be combined into a picture bank; an assigning unit configured to assign a universal resource locator (URL) to storing each tailored picture to be combined; and a second storage unit configured to store the URL of each tailored picture to be combined into a distributed database.

In implementations, the combination unit, which is configured to combine each tailored picture to be combined to obtain the combined picture, may be configured to obtain the URL of each tailored picture to be combined from the distributed database, obtain the respective tailored picture to be combined from the picture bank based on the URL of each tailored picture to be combined, and combine each tailored picture to be combined to obtain the combined picture.

In implementations, the apparatus further includes a time tracking unit configured to keep tracking of a time duration of an existence of the combined picture; a detection unit configured to determine whether the time duration of existence is greater than a set time period; a destroying unit configured to destroy the combined picture in response to determining that the time of existence is greater than the set time period.

According to the embodiments of the present disclosure, an instant communication method is further provided, which includes separately receiving pictures to be combined from at least two clients that conduct an instant communication; determining a visual center of each picture to be combined; tailoring a corresponding picture to be combined according to the visual center of each picture to be combined and a first set specification; combining each tailored picture to be combined to obtain a combined picture; separately sending the combined picture to the at least two clients, to cause the at least two clients to present the combined picture.

According to the embodiments of the present disclosure, a picture synthesis server is further provided. At least two clients conduct an instant communications via the picture synthesis server. The picture synthesis server includes a receiving unit configured to separately receive pictures to be combined from at least two clients that conduct an instant communication; a determination unit configured to determine a visual center of each picture to be combined; a tailoring unit configured to tailor a corresponding picture to be combined according to the visual center of each picture to be combined and a first set specification; a combination unit configured to combine each tailored picture to be combined to obtain a combined picture; a sending unit configured to separately send the combined picture to the at least two clients, to cause the at least two clients to present the combined picture.

The present disclosure provides a method and an apparatus of picture synthesis, an instant communication method, and a picture synthesis server. After obtaining at least two pictures to be combined, a visual center of each picture to be combined is determined. A respective picture to be combined is tailored according to the visual center of each picture to be combined and a first set specification. The tailored pictures to be combined are combined to form a combined picture. In this solution, when combining at least two pictures to be combined, a visual center of each picture to be combined is determined. Tailoring is then performed according to the visual center and a first set specification, and the tailored pictures to be combined are combined. Since a visual center of each picture to be combined has been fully taken into consideration, a visual effect of a combined picture that is obtained is ensured, thus improving the experience of a user.

BRIEF DESCRIPTION OF THE DRAWINGS

Accompanying drawings described herein are provided to enable a further understanding of the present disclosure, and are constituted as a portion of the present disclosure. Illustrative embodiments of the present disclosure and descriptions thereof are used for describing the present disclosure, and are not to be construed as improper limitations to the present disclosure. In the accompanying drawings.

DETAILED DESCRIPTION

In order to facilitate understanding of the technical problems to be solved by the present disclosure, and the technical solutions and beneficial effects, the present disclosure is described in further detail hereinafter in conjunction with the accompanying drawings and the embodiments. It should be noted that the specific embodiments described herein are merely used for describing the present disclosure, and are not used as limitations to the present disclosure.

Figure 1:
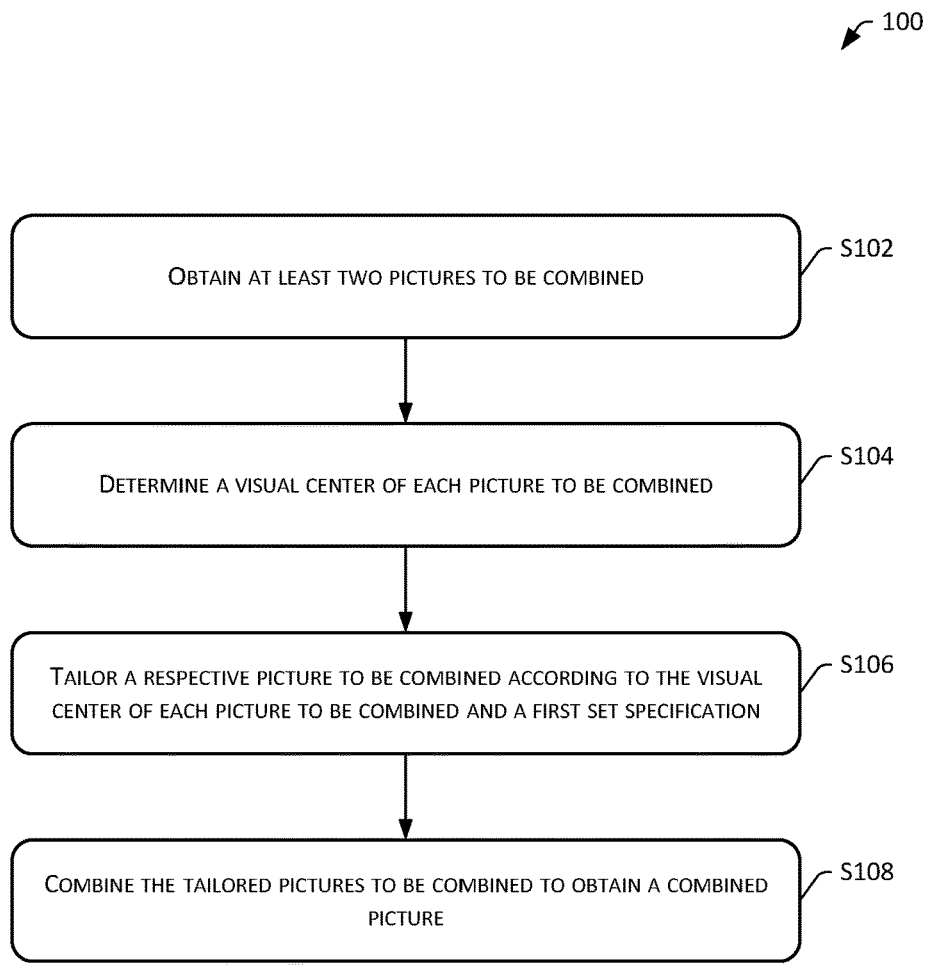
FIG. 1 shows a flowchart of a picture synthesis method in accordance with the embodiments of the present disclosure.

In order to solve the existence of the problem of poor visual effects of a combined picture which seriously affect user experience in existing technologies, the embodiments of the present disclosure provide a picture synthesis method 100 as shown in FIG. 1. The method 100 can be, but is not limited to being, applied in a terminal or a picture synthesis server/device. As shown in FIG. 1, the method 100 may include the following operations.

S102 obtains at least two pictures to be combined.

When combining pictures, original pictures are needed first. These original pictures may be called as pictures to be combined. The number of pictures to be combined may be two or more, e.g., two, three, four, etc.

S104 determines a visual center of each picture to be combined.

A visual center is the most intense and most important portion of a picture to be combined. A determination of a visual center of each picture to be combined is to ensure to obtain a crux for visual effects of a combined picture.

S106 tailors a corresponding picture to be combined according to the visual center of each picture to be combined and a first set specification.

Generally, when the pictures to be combined are combined, a specification for each picture to be combined is configured first. A first set specification may be defined. First set specifications of the pictures to be combined may be the same or different, and may be set up according to actual needs. When each picture to be combined is tailored, the visual center of each picture to be combined may be set as the center. A picture to be combined may be clipped to become a picture having a size as a first set specification, and thus tailoring the picture to be combined is achieved. In implementations, tailoring a picture may include clipping, cropping, or resizing (e.g., shrinking) the picture, for example.

An optional method includes starting two threads, one thread being used for storing each obtained picture to be combined to facilitate subsequent uses, and another thread being used for performing S104 and S106 to determine the visual center of each picture to be combined and to tailor the pictures to be combined.

S108 combines each tailored picture to be combined to obtain a combined picture.

In this operation, a preset background wall may be used when pictures are combined. Each tailored picture is pasted at a corresponding position to obtain a combined picture. Alternatively, each tailored picture is pasted at a corresponding position according to requirements defined by a user to obtain a combined picture.

In this solution, a visual center of each picture to be combined is determined when at least two pictures to be combined are combined. Tailoring is performed according to the visual center and a first set specification, and each tailored picture to be combined is combined. Since a visual center of each picture to be combined has been fully taken into consideration, a visual effect of a combined picture that is obtained is ensured, thus improving the experience of a user.

The above operations are described in further detail hereinafter.

In implementations, determining the visual center of each picture to be combined at S104 may include for each picture to be combined, dividing a current picture to be combined into sub-pictures having a size of a second set specification; calculating a set target identification value for each sub-picture using a set target identification algorithm; and clustering each sub-picture to obtain a visual center of the current picture to be combined based on the set target recognition value of each sub-picture and a clustering algorithm.

The pictures to be combined can be successively selected for determining respective visual centers, and a currently selected picture to be combined is the current picture to be combined.

When determining a visual center of a current picture to be combined, the current picture to be combined is needed to be divided first, and may be divided into sub-pictures of a size of a second set specification. The second set specification may be defined according to actual needs, and may be, for example, 256×256, 256×128, 1080×512, etc.

Defined target(s) is/are then identified from each sub-picture. A set target recognition algorithm is used for calculating a defined target identification value of each sub-picture. Defined target(s) may include a human face, an object, a building, a scene, etc. Different recognition algorithms are used for different defined targets. For example, when the defined target is a human face, a human face recognition algorithm may be used for calculating a human face identification value. When the defined target is a tie, a tie recognition algorithm may be used for calculating a tie identification value.

Finally, clustering may be performed on the sub-pictures according to respective set target identification values of the sub-pictures using a clustering algorithm. Accordingly, a visual center of the current picture to be combined is determined. A know clustering algorithm, such as K-means clustering algorithm, may be used for performing clustering.

In an optional implementation, based on a picture synthesis as shown in FIG. 1, the method further includes storing each tailored picture to be combined into a picture bank; assigning a universal resource locator (URL) to storing each tailored picture to be combined; and storing the URL of each tailored picture to be combined into a distributed database.

Correspondingly, combining each tailored picture to be combined to obtain the combined picture at S108 may include obtaining the URL of each tailored picture to be combined from the distributed database; obtaining the respective tailored picture to be combined from the picture bank based on the URL of each tailored picture to be combined; and combining each tailored picture to be combined to obtain the combined picture.

In order to use each tailored picture to be combined easily, each tailored picture to be combined may be stored in a picture bank. The picture bank stores a number of tailored pictures to be combined. Each picture to be combined is assigned with a URL. The URL is stored in a distributed database. The distributed database stores URLs of tailored pictures to be combined. Correspondingly, when combining tailored pictures to be combined, URLs of the tailored pictures to be combined are obtained from the distributed database, and the tailored pictures to be combined are obtained from the picture bank based on the URLs. As such, the process of determining visual centers of the tailored pictures to be combined and the process of tailoring can be skipped, thus saving the time of picture synthesis and improving the efficiency of the picture synthesis.

In implementations, based on a picture synthesis as shown in FIG. 1, the method further includes timing a duration of existence of the combined picture; determining whether the duration of existence is greater than a set time period; destroying the combined picture in response to determining that the time of existence is greater than the set time period.

In order to ensure the security of the combined picture, a time duration of existence of the combined picture is counted, and a detection is made as to whether the duration of existence is greater than a defined time period. In response to detecting that the duration of existence is greater than the defined time period, the combined picture may be destroyed. The defined time period can ensure the maximum period of time that a user can view the combined picture. A value of the defined time period can be set up according to actual needs, and can be set up as 10 seconds, 15 seconds, 20 seconds, for example.

Figure 2:
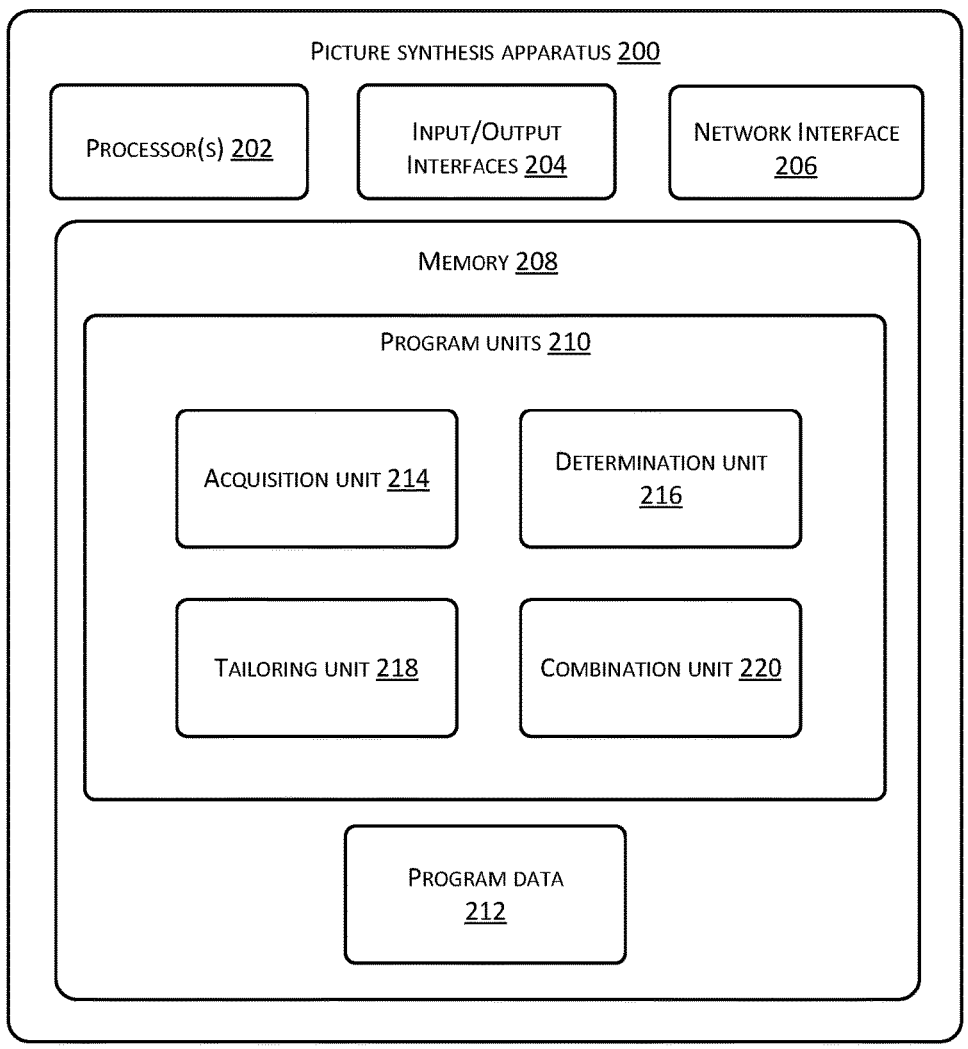
FIG. 2 shows a structural diagram of a first picture synthesis apparatus in accordance with the embodiments of the present disclosure.

Based on the same innovative concept, the embodiments of the present disclosure provide a picture synthesis apparatus 200 as shown in FIG. 2. In implementations, the apparatus 200 may be deployed in a picture synthesis server (or device), or a terminal. In other implementations, the apparatus 200 may include a computing device, such as a terminal, or may be a portion of a computing device. By way of example and not limitations, the apparatus 200 may include one or more processors 202, an input/output interface 204, a network interface 206, and memory 208.

The memory 208 may include a form of computer readable media such as a volatile memory, a random access memory (RAM) and/or a non-volatile memory, for example, a read-only memory (ROM) or a flash RAM. The memory 208 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 208 may include program units 210 and program data 212. The program units 210 may include an acquisition unit 214, a determination unit 216, a tailoring unit 218 and a combination unit 220.

The acquisition unit 214 is configured to obtain at least two pictures to be combined. The determination unit 216 is configured to determine a visual center of each picture to be combined. The tailoring unit 218 is configured to tailor a corresponding picture to be combined according to the visual center of each picture to be combined and a first set specification. The combination unit 220 is configured to combine each tailored picture to be combined to obtain a combined picture.

In this solution, a visual center of each picture to be combined is determined when at least two pictures to be combined are combined. Tailoring is performed according to the visual center and a first set specification, and each tailored picture to be combined is combined. Since a visual center of each picture to be combined has been fully taken into consideration, a visual effect of a combined picture that is obtained is ensured, thus improving the experience of a user.

In implementations, the determination unit 216, which is configured to determine the visual center of each picture to be combined, may be configured to divide a respective picture to be combined into sub-pictures having a size of a second set specification for each picture to be combined, calculate a set target identification value for each sub-picture using a set target identification algorithm, and cluster each sub-picture to obtain a visual center of the respective picture to be combined based on the set target recognition value of each sub-picture and a clustering algorithm.

Figure 3:
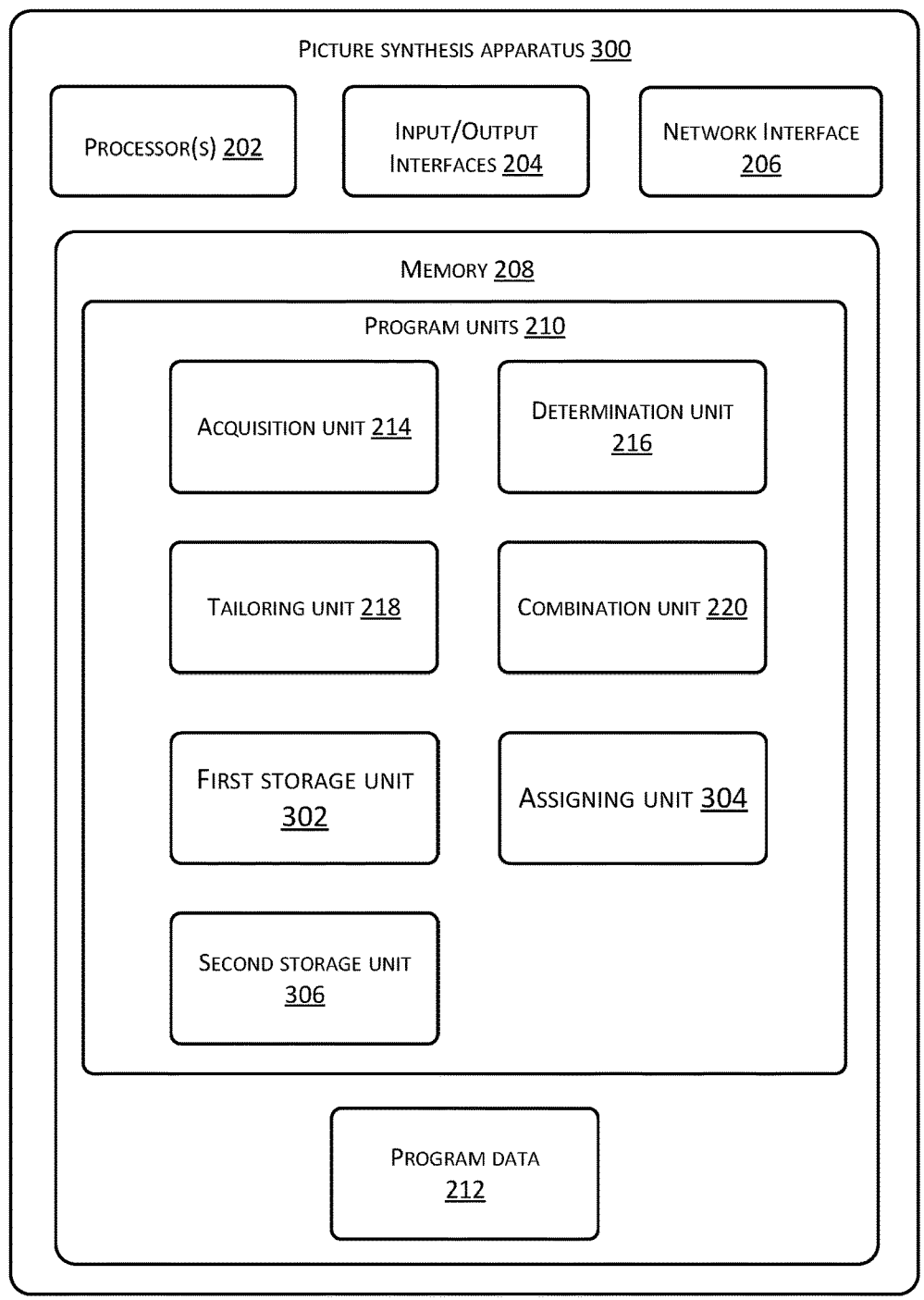
FIG. 3 shows a structural diagram of a second picture synthesis apparatus in accordance with the embodiments of the present disclosure.

FIG. 3 shows a structural diagram of a second picture synthesis apparatus 300 in accordance with the embodiments of the present disclosure. In implementations, the apparatus 300 may include one or more processors 202, an input/output interface 204, a network interface 206, and memory 208. In implementations, the memory 208 may include program units 210 and program data 212. The program units 210 may include an acquisition unit 214, a determination unit 216, a tailoring unit 218 and a combination unit 220. Details of these units can be found in the foregoing description, and are not repeatedly described herein.

In implementations, the apparatus 300 may further include a first storage unit 302, an assigning unit 304, and a second storage unit 306.

The first storage unit 302 is configured to store each tailored picture to be combined into a picture bank. The assigning unit 304 is configured to assign a URL to storing each tailored picture to be combined. The second storage unit 306 is configured to store the URL of each tailored picture to be combined into a distributed database.

In implementations, the combination unit 220, which is configured to combine each tailored picture to be combined to obtain the combined picture, may be configured to obtain the URL of each tailored picture to be combined from the distributed database, obtain the respective tailored picture to be combined from the picture bank based on the URL of each tailored picture to be combined, and combine each tailored picture to be combined to obtain the combined picture.

Figure 4:
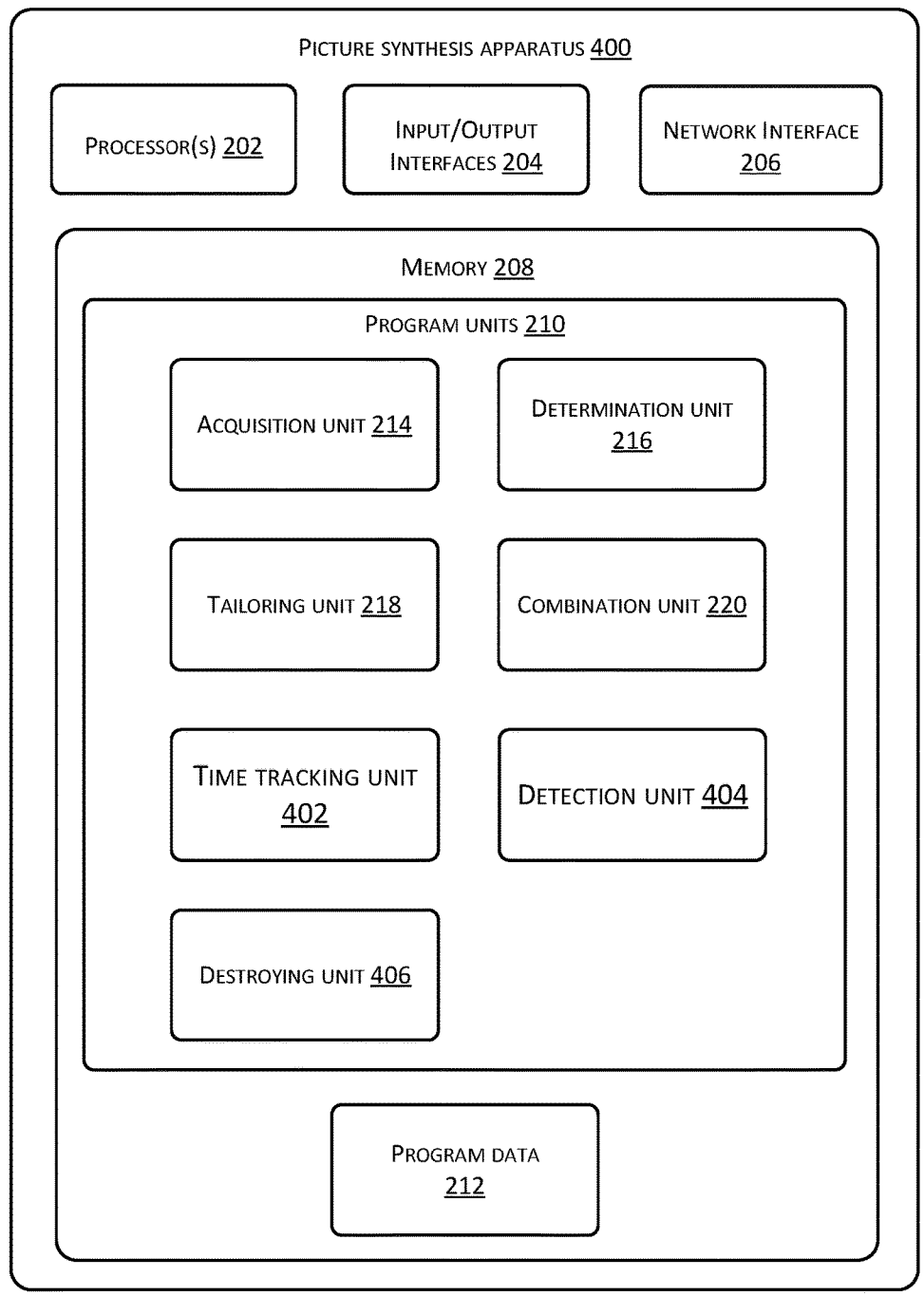
FIG. 4 shows a structural diagram of a third picture synthesis apparatus in accordance with the embodiments of the present disclosure.

FIG. 4 shows a structural diagram of a third picture synthesis apparatus 400 in accordance with the embodiments of the present disclosure. In implementations, the apparatus 400 may include one or more processors 202, an input/output interface 204, a network interface 206, and memory 208. In implementations, the memory 208 may include program units 210 and program data 212. The program units 210 may include an acquisition unit 214, a determination unit 216, a tailoring unit 218 and a combination unit 220. Details of these units can be found in the foregoing description, and are not repeatedly described herein.

In implementations, the apparatus 400 may further include a time tracking unit 402, a detection unit 404, and a destroying unit 406.

The time tracking unit 402 is configured to keep track of a duration of existence of the combined picture. The detection unit 404 is configured to determine whether the duration of existence is greater than a set time period. The destroying unit 406 is configured to destroy the combined picture in response to determining that the duration of existence is greater than the set time period.

Figure 5:
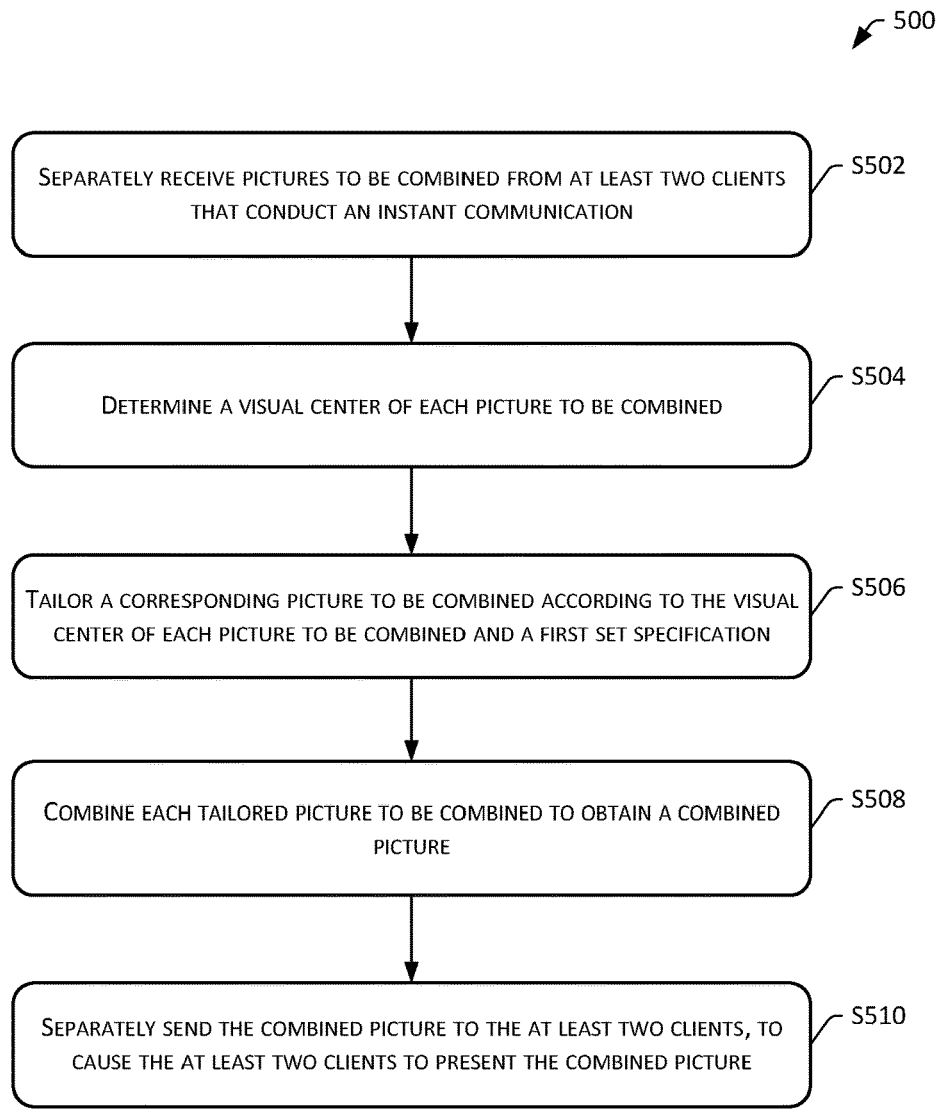
FIG. 5 shows a flowchart of an instant communication method in accordance with the embodiments of the present disclosure.

A method and an apparatus of picture synthesis are described above. Based on the same concept, the embodiments of the present disclosure further provide an instant communication method 500. The method 500 may be applied in a picture synthesis server/device. At least two clients can conduct an instant communication with each other via the picture synthesis server/device. As shown in FIG. 5, the method 500 may include includes the following.

S502 separately receives pictures to be combined from at least two clients that conduct an instant communication.

Along with the rapid development of networking technologies, the number of social applications increases daily. Commonly used applications include QQ, WeChat, Fetion, Alitalk, etc. Multiple users can use these applications for conducting communications, thus achieving instant communications among multiple users of different places. Currently, an increasing number of users select to use applications (which are abbreviated as clients herein) of client terminals to share private information, e.g., personal photos, scenery photos, pet photos, etc. In order to protect private information of a user, the picture synthesis server/device will not directly send a picture to other clients after receiving the picture from a client conducting instant communications with the other clients. Rather, the picture synthesis server/device performs sending after combining pictures sent by various client terminals that conduct instant communications with each other. Since pictures sent by various clients that conduct instant communications with each other are to be combined, these pictures can be treated as pictures to be combined. These pictures to be combined may not need to reach the picture synthesis server/device at the same time. Therefore, the picture synthesis server/device will individually receive pictures to be combined from clients that conduct instant communications with each other.

It should be noted that a user needs to provide picture(s) to be combined first when using a client to send the picture(s) to be combined to the picture synthesis server/device. There are a number of different ways of provision. For example, the user may select picture(s) to be combined from a local album, or capture image(s) to obtain picture(s) to be combined using an image capturing device deployed on a terminal, and send the picture(s) to be combined from the client to the picture synthesis server/device.

S504 determines a visual center of each picture to be combined.

A description of this operation can be referenced to the description of S102.

S506 tailors a corresponding picture to be combined according to the visual center of each picture to be combined and a first set specification.

A description of this operation can be referenced to the description of S104.

S508 combines each tailored picture to be combined to obtain a combined picture.

A description of this operation can be referenced to the description of S13.

S510 separately sends the combined picture to the at least two clients, to cause the at least two clients to present the combined picture.

Continuing with the above example, the picture synthesis server/device combines all pictures to be combined that are received. The number of pictures to be combined is at least two, and may be two, three, four, etc. The combined picture is then separately sent to the at least two clients that conducts instant communications with each other. Each client may present the combined picture to facilitate browsing by a user thereof.

In this solution, after combining pictures to be combined that are sent by at least two clients conducting instant communications, the picture synthesis server/device sends a combined picture to each client. The combined picture includes the pictures to be combined that are sent by the at least two clients conducting instant communications. In other words, users, who conduct instant communications with each other, share pictures of other parties only after sharing pictures of their own. Therefore, respective privacy of the users who conduct the instant communications can be protected.

Figure 6:
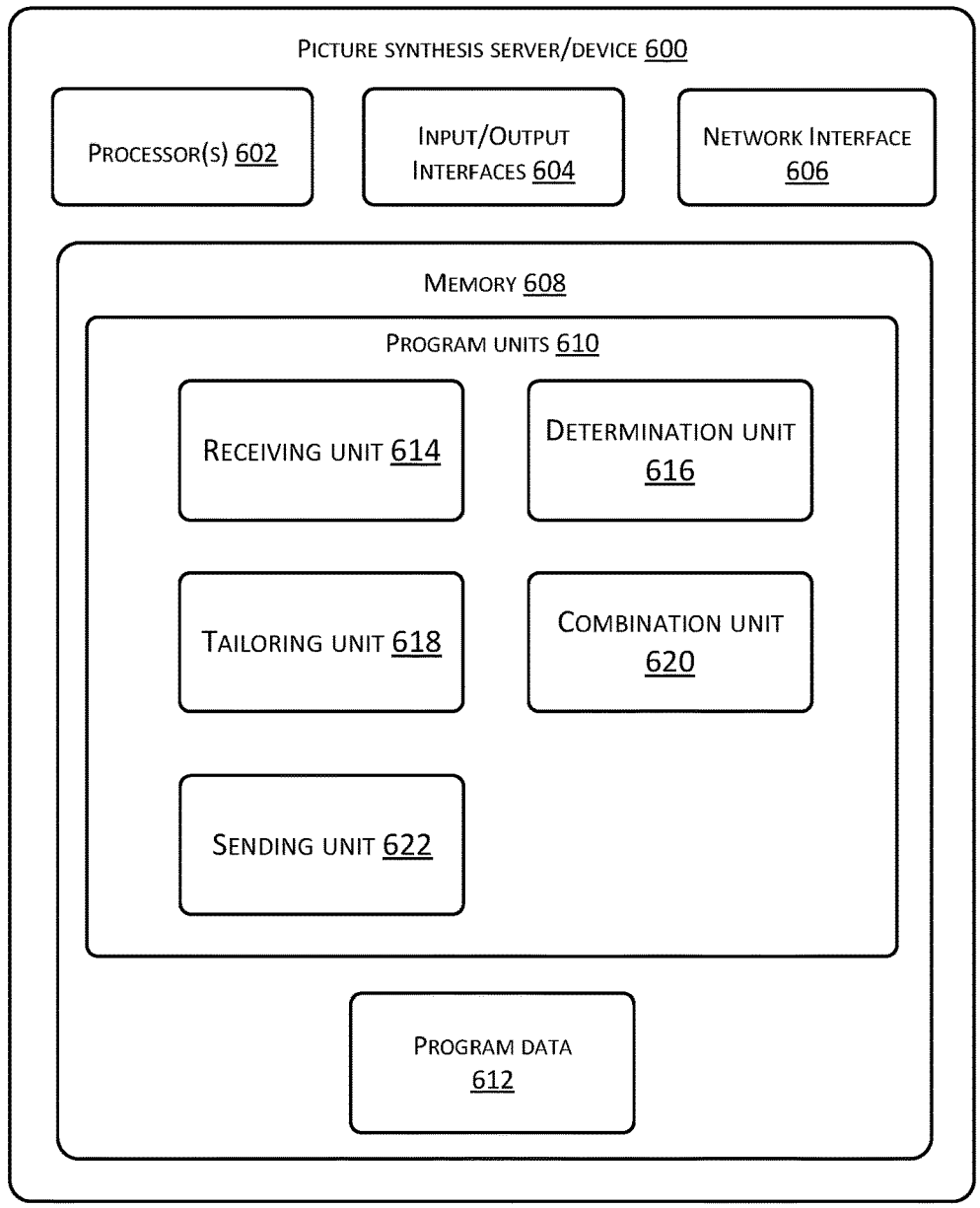
FIG. 6 shows a structural diagram of a picture synthesis server in accordance with the embodiments of the present disclosure.

Based on the same innovative concept, the embodiments of the present disclosure further provide a picture synthesis server/device 600 as shown in FIG. 6. At least two clients conduct instant communications via the picture synthesis server/device 600. In implementations, the picture synthesis server 600 may include a computing device, or may be a portion of a computing device. By way of example and not limitations, the picture synthesis server/device 600 may include one or more processors 602, an input/output interface 604, a network interface 606, and memory 608. The memory 608 is an example of a computer readable media as described in the foregoing description.

In implementations, the memory 608 may include program units 610 and program data 612. The program units 610 may include a receiving unit 614, a determination unit 616, a tailoring unit 618, a combination unit 620, and a sending unit 622.

The receiving unit 614 is configured to separately receive pictures to be combined from at least two clients that conduct an instant communication.

The determination unit 616 is configured to determine a visual center of each picture to be combined.

The tailoring unit 618 is configured to tailor a corresponding picture to be combined according to the visual center of each picture to be combined and a first set specification.

The combination unit 620 is configured to combine each tailored picture to be combined to obtain a combined picture.

The sending unit 622 is configured to separately send the combined picture to the at least two clients, to cause the at least two clients to present the combined picture.

In this solution, after combining pictures to be combined that are sent by at least two clients conducting instant communications, the picture synthesis server/device sends a combined picture to each client. The combined picture includes the pictures to be combined that are sent by the at least two clients conducting instant communications. In other words, users, who conduct instant communications with each other, share pictures of other parties only after sharing pictures of their own. Therefore, respective privacy of the users who conduct the instant communications can be protected.

Exemplary embodiments of the present disclosures are illustrated and described above. However, as described above, the present disclosure should not be limited to the forms described in the current specification, and should not be construed as excluding other embodiments. The present disclosure can be used in other combinations, modifications and environments, and can be changed within the creative scope of the present disclosure based on technologies and knowledge of related fields or the foregoing teachings. Changes and variations made by one skill in the art that are not outside the spirit and scope of the present disclosure shall fall in the scope of protection of the appended claims of the present disclosure.

What is claimed is:

1. A method implemented by one or more computing devices, the method comprising:
    obtaining a plurality of pictures to be combined;
    determining visual centers of the plurality of pictures to be combined;
    tailoring the plurality of pictures to be combined according to the visual centers of the plurality of pictures to be combined and a first set specification; and
    combining the plurality of tailored pictures to be combined to obtain a combined picture,
    wherein the determining the visual centers of the plurality of pictures to be combined includes:
    dividing a respective picture of the plurality of pictures to be combined into sub-pictures having a size of a second set specification;
    calculating respective set target identification values for the sub-pictures; and
    clustering the sub-pictures to obtain a visual center of the respective picture to be combined at least based on the respective set target recognition values of the sub-pictures.

2. The method of claim 1, wherein:
    the calculating the respective set target identification values for the sub-pictures includes calculating the respective set target identification values for the sub-pictures using a set target identification algorithm; and
    the clustering the sub-pictures to obtain the visual center of the respective picture to be combined at least based on the respective set target recognition values of the sub-pictures includes clustering the sub-pictures to obtain the visual center of the respective picture to be combined based on the respective set target recognition values of the sub-pictures and a clustering algorithm.

3. The method of claim 2, further comprising:
    assigning uniform resource locators (URLs) to the plurality of tailored pictures to be combined; and
    storing the URLs of the plurality of tailored pictures to be combined into a distributed database.

4. The method of claim 3, wherein the combining the plurality of tailored pictures to be combined to obtain the combined picture comprises:

obtaining the URLs of the plurality of tailored pictures to be combined from the distributed database;
obtaining the plurality of tailored pictures to be combined from the picture bank based on the URLs of the plurality of tailored pictures to be combined; and
combining the plurality of tailored pictures to be combined to obtain the combined picture.

5. The method of claim 1, further comprising storing the plurality of tailored pictures to be combined into a picture bank.

6. The method of claim 1, further comprising keeping tracking of a time duration of an existence of the combined picture.

7. The method of claim 6, further comprising:
determining whether the time duration of existence is greater than a set time period; and
destroying the combined picture in response to determining that the time of existence is greater than the set time period.

8. The method of claim 1, wherein the tailoring the plurality of pictures comprises one of clipping, cropping, resizing the plurality of pictures according to the visual centers of the plurality of pictures to be combined and the first set specification.

9. An apparatus comprising:
one or more processors; and
memory storing computer-readable instructions that, when executed by the one or more processors, cause the one or more processors to perform acts comprising:
obtaining a plurality of pictures to be combined;
determining visual centers of the plurality of pictures to be combined;
tailoring the plurality of pictures to be combined according to the visual centers of the plurality of pictures to be combined and a first set specification; and
combining the plurality of tailored pictures to be combined to obtain a combined picture,
wherein the determining the visual centers of the plurality of pictures to be combined includes:
dividing a respective picture of the plurality of pictures to be combined into sub-pictures having a size of a second set specification;
calculating respective set target identification values for the sub-pictures; and
clustering the sub-pictures to obtain a visual center of the respective picture to be combined at least based on the respective set target recognition values of the sub-pictures.

10. The apparatus of claim 9, wherein:
the calculating the respective set target identification values for the sub-pictures includes calculating the respective set target identification values for the sub-pictures using a set target identification algorithm; and
the clustering the sub-pictures to obtain the visual center of the respective picture to be combined at least based on the respective set target recognition values of the sub-pictures includes clustering the sub-pictures to obtain the visual center of the respective picture to be combined based on the respective set target recognition values of the sub-pictures and a clustering algorithm.

11. The apparatus of claim 9, wherein the acts further comprise storing the plurality of tailored pictures to be combined into a picture bank.

12. The apparatus of claim 11, wherein the acts further comprise:
assigning uniform resource locators (URLs) to the plurality of tailored pictures to be combined; and
storing the URLs of the plurality of tailored pictures to be combined into a distributed database.

13. The apparatus of claim 12, wherein the combining the plurality of tailored pictures to be combined to obtain the combined picture comprises:
obtaining the URLs of the plurality of tailored pictures to be combined from the distributed database;
obtaining the plurality of tailored pictures to be combined from the picture bank based on the URLs of the plurality of tailored pictures to be combined; and
combining the plurality of tailored pictures to be combined to obtain the combined picture.

14. The apparatus of claim 9, wherein the acts further comprise keeping tracking of a time duration of an existence of the combined picture.

15. The apparatus of claim 14, wherein the acts further comprise:
determining whether the time duration of existence is greater than a set time period; and
destroying the combined picture in response to determining that the time of existence is greater than the set time period.

16. The apparatus of claim 9, wherein the tailoring the plurality of pictures comprises one of clipping, cropping, resizing the plurality of pictures according to the visual centers of the plurality of pictures to be combined and the first set specification.

17. Memory storing computer-readable instructions that, when executed by one or more processors, cause the one or more processors to perform acts comprising:
separately receiving pictures to be combined from a plurality of clients that conduct instant communications;
determining visual centers of the pictures to be combined;
tailoring the pictures to be combined according to the visual centers of the pictures to be combined and a first set specification; and
combining the tailored pictures to be combined to obtain a combined picture,
wherein the determining the visual centers of the pictures to be combined includes:
dividing a respective picture of the pictures to be combined into sub-pictures having a size of a second set specification;
calculating respective set target identification values for the sub-pictures; and
clustering the sub-pictures to obtain a visual center of the respective picture to be combined at least based on the respective set target recognition values of the sub-pictures.

18. The memory of claim 17, wherein the acts further comprise separately sending the combined picture to the plurality of clients, to cause the plurality of clients to present the combined picture.

19. The memory of claim 17, wherein:
the calculating the respective set target identification values for the sub-pictures includes calculating the respective set target identification values for the sub-pictures using a set target identification algorithm; and
the clustering the sub-pictures to obtain the visual center of the respective picture to be combined at least based on the respective set target recognition values of the sub-pictures includes clustering the sub-pictures to obtain the visual center of the respective picture to be combined based on the respective set target recognition values of the sub-pictures and a clustering algorithm.

20. The memory of claim 17, wherein the tailoring the pictures comprises one of clipping, cropping, resizing the pictures according to the visual centers of the pictures to be combined and the first set specification.

\* \* \* \* \*